United States Patent
Cheng et al.

(10) Patent No.: US 7,953,651 B2
(45) Date of Patent: May 31, 2011

(54) VALIDATING UPDATED BUSINESS RULES

(75) Inventors: Isaac Kam-Chak Cheng, San Jose, CA (US); Scott Richard Holmes, Morgan Hill, CA (US); Vikas Krishna, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 11/362,681

(22) Filed: Feb. 27, 2006

(65) Prior Publication Data

US 2007/0239570 A1    Oct. 11, 2007

(51) Int. Cl.
 *G06Q 40/00* (2006.01)
(52) U.S. Cl. .......................................................... 705/35
(58) Field of Classification Search ................ 705/1, 1.1, 705/53
 See application file for complete search history.

(56) References Cited

U.S. PATENT DOCUMENTS

| | | | |
|---|---|---|---|
| 5,265,221 A | 11/1993 | Miller | |
| 5,367,619 A | 11/1994 | Dipaolo et al. | |
| 5,694,540 A | 12/1997 | Humelsine et al. | |
| 6,145,082 A | 11/2000 | Gannon et al. | |
| 6,336,139 B1 | 1/2002 | Feridun et al. | |
| 6,411,936 B1 | 6/2002 | Sanders | |
| 7,089,583 B2 * | 8/2006 | Mehra et al. | 726/3 |
| 2002/0049691 A1 | 4/2002 | Majoor | |
| 2003/0033528 A1 | 2/2003 | Ozog et al. | |
| 2004/0083199 A1 * | 4/2004 | Govindugari et al. | 707/1 |
| 2004/0128229 A1 * | 7/2004 | Raines et al. | 705/38 |
| 2005/0047412 A1 | 3/2005 | Hares | |
| 2005/0204041 A1 * | 9/2005 | Blinn et al. | 709/225 |
| 2006/0294151 A1 * | 12/2006 | Wong et al. | 707/200 |

FOREIGN PATENT DOCUMENTS

JP    2004240571 A2    8/2004

* cited by examiner

*Primary Examiner* — Ella Colbert
(74) *Attorney, Agent, or Firm* — Schmeiser, Olsen & Watts

(57) ABSTRACT

A computer-implemented method for validating updated business rules. A first set of documents utilized to validate a first set of business rules is provided. A second set of business rules generated from an update of the first set of business rules is received. Each business rule includes input parameters. A second set of documents is received. A template file includes the input parameters and corresponding path expressions. An augmented set of documents includes the first and second sets of documents. The second set of business rules is automatically semantically validated against the augmented set of documents. The semantic validation includes executing the second set of business rules with each document of the augmented set. The executing includes binding, via the path expressions, the input parameters to values included in a document of the augmented set.

6 Claims, 8 Drawing Sheets

XML Entries

▶ XML Entries

Define the entries to capture from the xml document.

- ⊟ cXML
  - = payloadID — 1104769109748.206607081
  - = timestamp — 2005-01-03T11:18:29-05:00
  - = version — 1.2.007
  - ⊟ Header
  - ⊟ Request
    - = deploymentMode — production
    - ⊟ OrderRequest
      - ⊟ OrderRequestHeader
        - = orderDate — 2005-01-03T11:18:29-05:00
        - = orderID — 51000005966
        - = orderType — regular
        - = type — new
        - ⊞ Total
        - ⊟ ShipTo
          - ⊟ Address
            - = addressID — 342LJOH
            - = isoCountryCode — US
            - Name
            - ⊞ PostalAddress
            - ⊞ Email
            - ⊞ Phone
            - ⊞ URL ▶ Entry Details Name: XMLEntry
Description: The name of the person to sh
Target attribute: Name
XPath: /cXML/Request/OrderReques Overview | XML Entries

VALIDATING UPDATED BUSINESS RULES

BACKGROUND OF THE INVENTION

1. Technical Field

The present invention relates to a method and program product for validating updated business rules.

2. Related Art

Business rules change frequently due to changes in user requirements, company policies, government regulations, economic trends, etc. Conventionally, business rule logic is embedded into application logic, and spread across various parts of an enterprise information system, thereby making it difficult and expensive to identify and change business rule logic as required by dynamic business scenarios. To make changes to business rule logic in conventional systems, developers must know implementation details and determine where to make changes without affecting other existing code. Thus, there exists a need to overcome at least one of the preceding deficiencies and limitations of the related art.

SUMMARY OF THE INVENTION

In first embodiments, the present invention provides a computer-implemented method of validating business rules, comprising:

providing a first set of one or more documents previously utilized to validate a first set of one or more business rules;

receiving a second set of one or more business rules to be validated, the second set of one or more business rules generated from a previous update of the first set of one or more business rules, wherein a business rule of the second set of one or more business rules includes a Boolean expression that includes one or more input parameters;

receiving a second set of one or more documents;

providing a template file that includes the one or more input parameters and one or more path expressions associated therewith in a one-to-one correspondence;

augmenting the first set of one or more documents with the second set of one or more documents to provide an augmented set of documents; and automatically validating the second set of one or more business rules, the validating performed against the augmented set or against a subset of the augmented set, wherein the automatically validating comprises:

semantically validating the second set of one or more business rules, wherein the semantically validating includes executing the second set of one or more business rules or a subset of the second set of one or more business rules with each document of the augmented set of documents, wherein the executing includes binding, via the one or more path expressions, the one or more input parameters to one or more values included in a document of the augmented set of one or more documents; and evaluating, responsive to the binding, the Boolean expression with the one or more values.

In second embodiments, the present invention provides a computer-implemented method of validating business rules, comprising:

providing a first set of one or more documents previously utilized to validate a first set of one or more business rules, the first set of one or more documents residing in a gateway of a computing system, the gateway being a middleware component of the computing system;

receiving at the gateway, and from a knowledge base external to the gateway, a second set of one or more business rules generated from a previous update in the knowledge base of the first set of one or more business rules, wherein a business rule of the second set of one or more business rules includes one or more input parameters;

receiving at the gateway a second set of one or more documents based on the second set of one or more business rules;

generating a template file external to the gateway, the template file binding in a one-to-one correspondence the one or more input parameters with one or more values included in a document of the second set of one or more documents;

augmenting the first set of one or more documents with the second set of one or more documents to provide an augmented set of documents; and automatically validating the second set of one or more business rules, the validating performed against the augmented set, wherein the automatically validating comprises executing the second set of one or more business rules with each document of the augmented set of documents, wherein the executing employs the one or more values if the executing is performed with the document of the second set of one or more documents.

Computer program products corresponding to the above-summarized methods are also described and claimed herein.

Advantageously, the present invention provides a business rule validation technique that employs a simplified rule interface that enables business users of a computing system to change business rules easily, quickly, frequently and dynamically while maintaining the availability and stability of the system. The simplified interface facilitates cost-effective business rule updates by decreasing or eliminating the need for skilled programmers to maintain the business rules.

BRIEF DESCRIPTION OF THE DRAWINGS

FIG. 7 is a screen capture of a tool for authoring and editing the template of FIG. 2, in accordance with embodiments of the present invention.

DETAILED DESCRIPTION OF THE INVENTION

The present invention provides a technique for business rule validation that enables business users to change business rules frequently and dynamically in a computing system while maintaining the availability and stability of the system. As used herein, a business rule is defined as a statement that defines or constrains some aspect of a business. Constraints of this type are present in business applications, such as procurements, auction configuration, financial applications, catalogs, storefronts, security authorization and trust management. A business rule may include (1) a condition (a.k.a. Boolean expression) that is true or false when applied to a document, and (2) a result that occurs or an action that is performed if the condition is true when applied to the document. Further, the Boolean expression of a business rule may include one or more formal input parameters whose actual values are extracted from one or more values in a document by binding the one or more values to the one or more input parameters in a one-to-one correspondence. Still further, a business rule is authored and updated in a format that is not programming code. Two examples of business rules include: (1) If the cost of an item is greater than $20.00, then shipping is free; and (2) If the state is Ohio, then an optional Credit Insurance form is required.

In one embodiment, business rules determine the routing of documents. Document routing is the decision process for determining optimal targets for receiving a set of documents. A target is a storage or computing device (e.g., content management system), or a person who receives the documents via a computing device. Determining an optimal target with respect to a specific document depends on the amount of value the target produces by consuming the document, as well as the costs related to the target receiving the document. For example, if representative X's duties include reviewing purchase orders from customer Y, then X is indicated as the optimal target by a business rule that designates X as the email recipient for any purchase order document that includes a customer name of Y. In this example, the business rule can be "IfCustomerName='Y', then email the purchase order to X at x@us.ibm.com."

Figure 1:
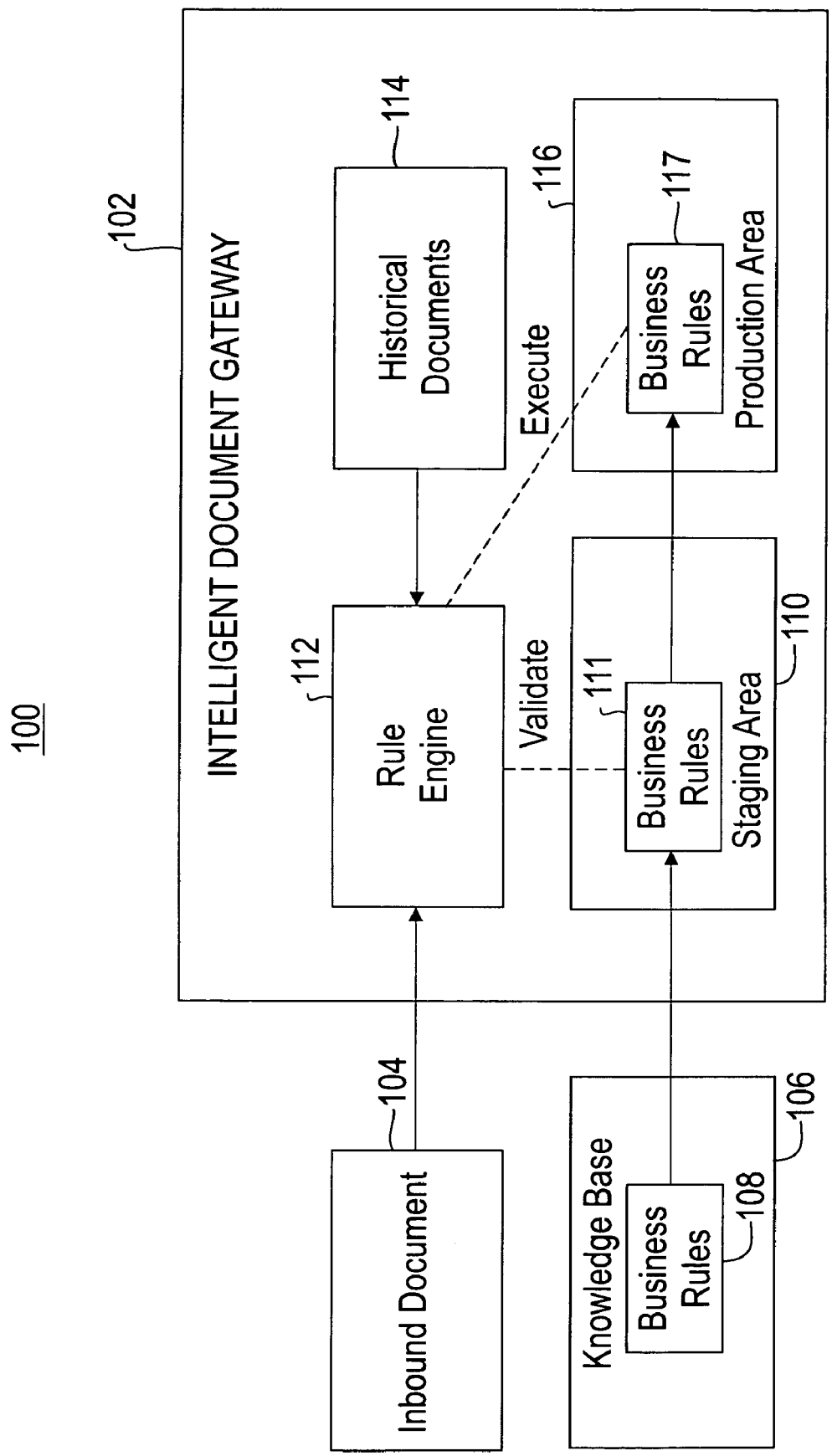
FIG. 1 is a block diagram of a system for validating business rules, in accordance with embodiments of the present invention.

FIG. 1 is a block diagram of a system 100 for validating business rules, in accordance with embodiments of the present invention. System 100 includes an intelligent document gateway (IDG) 102, an inbound document 104 received by IDG 102, and a knowledge base 106 that includes a set of one or more business rules 108. IDG 102 is a software component of a computing system that resides in, for example, middleware. IDG 102 validates and executes business rules. Inbound document 104 may be of any document type (e.g., XML document). One or more other documents (not shown) may also be received by IDG 102. In one embodiment, inbound document 104 is a text document. In another embodiment, inbound document 104 is a document in a generalized markup language, such as XML. In still another embodiment, inbound document 104 is a document in a proprietary format, such as Microsoft® Word.

Prior to being received by IDG 102, the set of one or more business rules 108 is updated by an end user of computing system 100. In one embodiment, the updating of business rules 108 is performed by a business user. As used herein, a business user is defined as an end user who is able to utilize software applications (e.g., a spreadsheet tool), and who does not require skills in reading or writing computer programs, macros or scripts to read a business rule or to perform an update of a set of business rules. Hereinafter, a business user is also referred to simply as a user. Further, as used herein, an update of a set of business rules is defined as adding a new business rule to a set of existing business rules, deleting a business rule from the set of existing business rules, or replacing a business rule of the set of existing business rules with another business rule.

IDG 102 receives one or more inbound documents (e.g., inbound document 104) of any type from multiple channels (e.g., printer and scanner), automatically extracts metadata from the inbound documents, and executes business rules having logic associated with the workflow of the inbound documents. The inbound document flow triggers external actions based on the metadata associated with the inbound documents. IDG 102 includes a staging area 110 that includes a set of one or more business rules 111 to be validated by rule engine 112. The set of one or more business rules 111 is set 108 received by staging area 110 after the update of set 108. Rule engine 112 is, for example, an Agent Building and Learning Environment (ABLE) rule processing engine, which is available from International Business Machines Corporation of Armonk, N.Y.

IDG 102 also includes one or more historical documents 114 that were previously inbound documents received by IDG 102. Further, IDG 102 includes a production area 116 that includes a set of one or more business rules 117 that are executed by rule engine 112. Historical documents 114 were previously inbound documents received by IDG 102, and were utilized to validate business rules 117. In one embodiment, inbound document 104 and historical documents 114 include data pertinent to business transactions. In another embodiment inbound document 104 and historical documents 114 include data pertinent to business-to-business purchase transactions (e.g., customer and purchase order information). Rule engine 112 validates business rules 111 against an augmented set of documents that includes inbound documents (e.g., document 104) and historical documents 114. The validation of each business rule 111 includes binding one or more input parameters of the business rule being validated to one or more actual values in each document of the augmented set of documents. Business rule validation is described in more detail below relative to FIGS. 3-5. After business rules 111 are validated, they are moved into production area 116.

Business Rule Example

The following example illustrates two business rules executed by IDG 102, which receives inbound documents that are purchase orders from various customers that must be routed to specific customer service representatives. IDG 102 receives the purchase order documents from an enterprise service bus (ESB) via Java® Messaging Services (JMS).

Rule 1: If the customer name contains the string "A88" and the country code is in the set {UK, SE}, then notify the following customer service representatives by email:

To: user1@uk.ibm.com

Cc: mgr1@fr.ibm.com, mgr2@uk.ibm.com

Bcc: customer_support@ibmc1.pc.e2open.net

Rule 2: If the customer identifier is AN01000099582 and the country code is not US, then notify the following customer service representatives by email:

To: user2@jp.ibm.com

Cc: mgr3@fr.ibm.com, mgr4@it.ibm.com

Bcc: customer_support@ibmc1.pc.e2open.net

During the execution of the business rules by IDG 102, the actual input parameter values are obtained from each purchase order, which is an XML document. Rule actions are embedded in XML, compressed, and sent to an appropriate outbound ESB.

Runtime Architecture

IDG 102 has the flexibility to work with any inbound document type and any set of business rules. This flexibility is based on the externalization of both the business rules and the structure of inbound documents. Business rules are externalized as a comma-separated value (CSV) file. The CSV file allows business users to author and edit the business rules in a familiar paradigm, such as a spreadsheet tool (e.g., Microsoft® Excel®). The editing of business rules is discussed below relative to FIG. 7. Each business rule can have one or more input parameters, whose values are determined at runtime.

Figure 2:
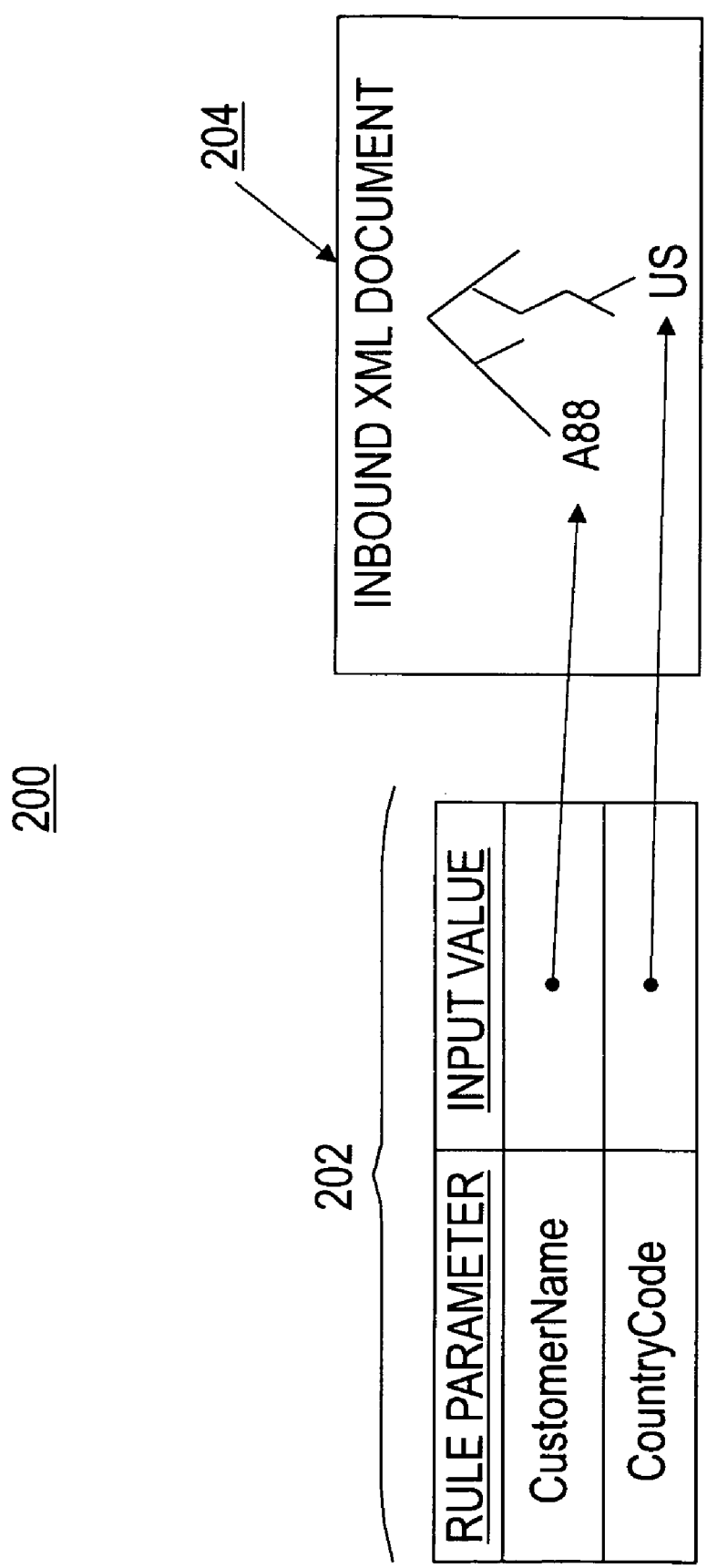
FIG. 2 is a block diagram of an inbound document and a template of the system of FIG. 1, in accordance with embodiments of the present invention.

The structure of the inbound documents is externalized via a template. FIG. 2 is a block diagram of a portion of a runtime architecture 200 for the system of FIG. 1. Architecture 200 includes a template file 202 (e.g., XML template file) that facilitates the externalization of the structure of an inbound XML document 204. Template file 202 is associated with a document type, and includes one or more business rule parameter names and one or more references (i.e., path expressions) associated with the parameter names in a one-to-one correspondence. In one embodiment, the one or more references are XML path expressions. The one or more references indicate the location of one or more input values (i.e., runtime values) that reside in an inbound document 104 (see FIG. 1) or a historical document 114 (see FIG. 1), thereby facilitating a binding of the one or more parameter names with the one or more input values in a one-to-one correspondence. In one embodiment, template 202 is a table of data item pairs, where each pair includes a parameter name and a reference to a location of a value in a document.

FIG. 2 depicts a binding in template file 202 between rule parameter names CustomerName and CountryCode and the locations of their respective runtime values located in an inbound document 204. An entire XML document is depicted as the tree structure in inbound document 204, and runtime values of A88 and US within document 204 are bound to CustomerName and CountryCode, respectively. Although not shown in FIG. 1, template file 202 is generated and resides external to IDG 102 (see FIG. 1).

When executing a business rule as described below, IDG 102 (see FIG. 1) utilizes template file 202 to determine where input values are located within a document 204. For example, if a business rule states "if CustomerName='GSK', email mgr1@fr.ibm.com" then IDG 102 (see FIG. 1) utilizes a template file that includes a pair of data values such as (CustomerName, /Shipment/Address/CompanyName). The pair indicates to IDG 102 (see FIG. 1) that a customer name in a document resides in a CompanyName field that is included within an Address area of a Shipment section of the document.

In one embodiment, multiple template files co-exist, where each template file indicates locations of input values for a specific type of document. Input values in documents of the same type have substantially the same structure and are referenced by the same path expression. For example, if the only difference between documents is that some documents include 5 digit zip codes and other documents include 9 digit zip codes, these documents may be grouped as the same type. On the other hand, if documents vary as to the location of their customer names (e.g., the paths specifying the locations of customer names vary), then each different location of a customer name corresponds to a different type of document. In another embodiment, a single template file is designed to be more inclusive, thereby allowing IDG 102 (see FIG. 1) to locate input values in documents, even if those documents vary as to the path expressions or field names that indicate input values. The above-described embodiments relative to template files allow IDG 102 (see FIG. 1) to receive and process any inbound document type with any internal document structure.

Updating and Validating Business Rules

Figure 3:
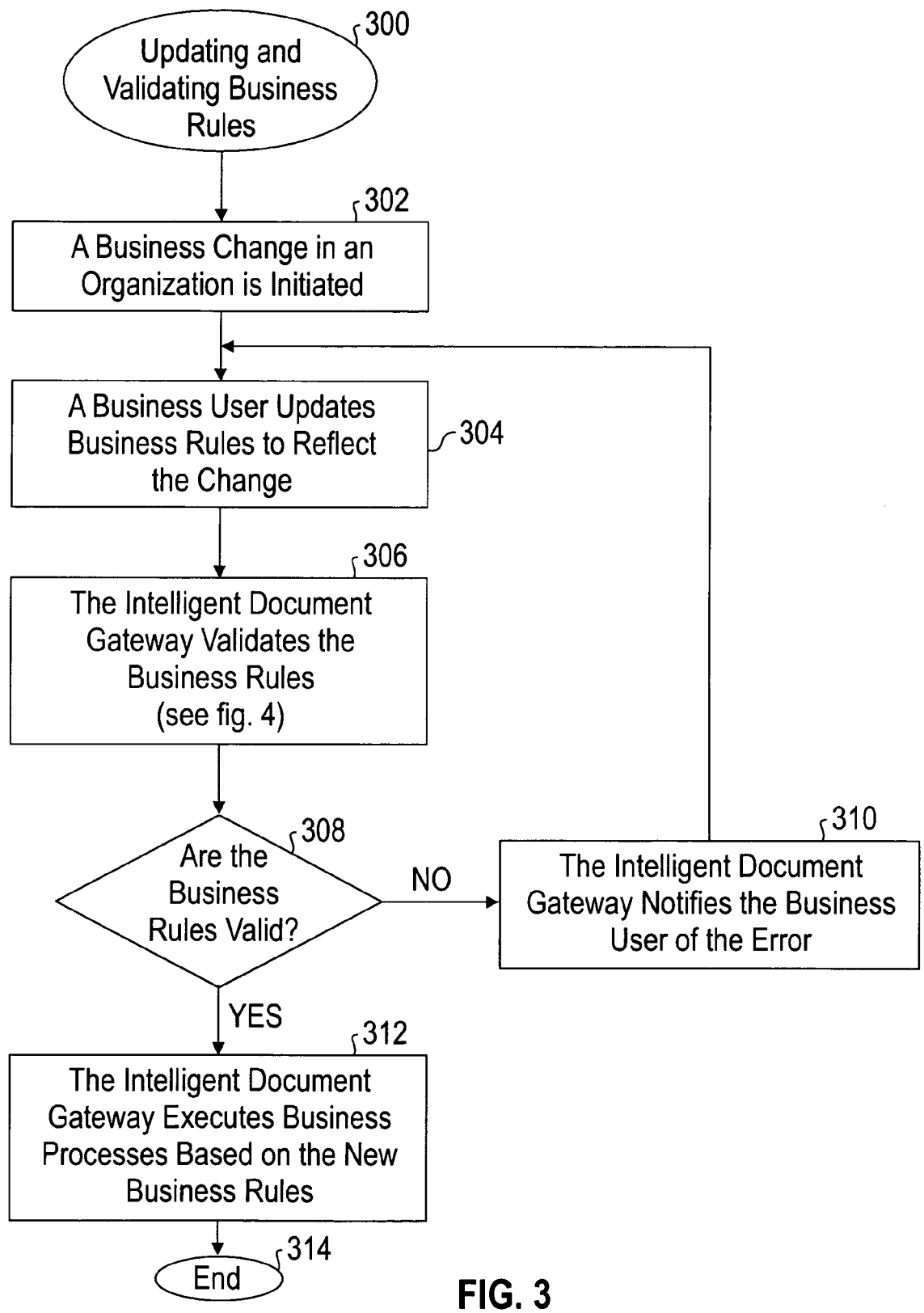
FIG. 3 is a flow chart of a process that implements the update and validation of business rules for the system of FIG. 1, in accordance with embodiments of the present invention.

FIG. 3 is a flow chart of a process that implements the update and validation of business rules for the system of FIG. 1, in accordance with embodiments of the present invention. The business rule update and validation process begins at step 300. A set of one or more business rules in knowledge base 106 (see FIG. 1) determines the business logic of IDG 102 (see FIG. 1). For one or more reasons (e.g., employee turnover), a business change is initiated in an organization in step 302. In step 304, a business user updates at least one business rule of a set of one or more business rules to reflect the business change of step 302. The updating of the at least one business rule generates an updated set of one or more business rules. Updating a business rule by a business user is described below relative to FIG. 7.

In step 306, IDG 102 (see FIG. 1) validates the updated set of one or more business rules. As used herein, validating a set of business rules is defined as validating each business rule in the set. The details of business rule validation are discussed below relative to FIG. 4. Inquiry step 308 determines if the updated set of one or more business rules is valid. If step 308 determines that one or more business rules of the updated set are not valid, IDG 102 (see FIG. 1) automatically notifies a business user (e.g., via email) of the invalid business rule(s) in step 310, and the process repeats starting at step 304. Compared to the user who updates the one or more business rules in step 304, the business user who is notified in step 310 may be the same user or a different user. If step 308 determines that the updated set of one or more business rules is valid, then the IDG executes business processes based on the updated set of business rules in step 312. The update and validation process ends at step 314.

Figure 4:
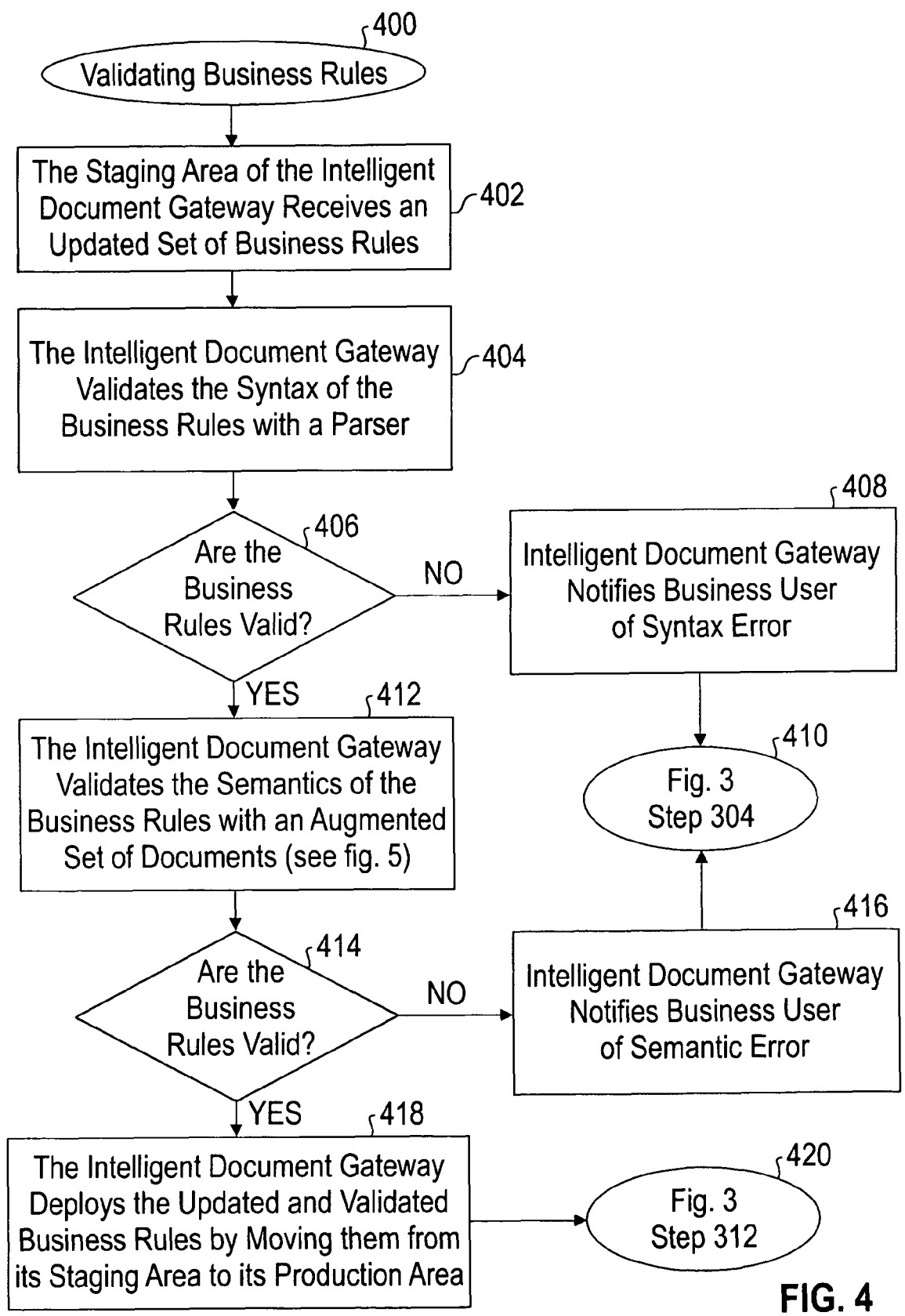
FIG. 4 is a flow chart of an algorithm that implements a validation step of the process of FIG. 3, in accordance with embodiments of the present invention.

FIG. 4 is a flow chart of the process of validation step 306 of FIG. 3, in accordance with embodiments of the present invention. The validation process of FIG. 4 starts at step 400. In step 402, staging area 110 (see FIG. 1) of IDG 102 (see FIG. 1) receives the updated set of one or more business rules. IDG 102 also receives a set of one or more new documents (e.g., new test documents). In step 404, a parser included in IDG 102 (see FIG. 1) checks for syntactic errors in the business rules of the updated set. The parser checking the syntax of the business rules implements a context-free grammar. If inquiry step 406 determines that one or more business rules of the updated set are not valid based on the syntax check of step 404 (i.e., one or more syntax errors are found in step 404), then IDG 102 (see FIG. 1) automatically notifies a business user of the syntax error(s) in step 408, and step 410 indicates that the updating and validation process continues at step 304 of FIG. 3.

If inquiry step 406 determines that the updated set of business rules is valid based on the syntax check of step 404, then IDG 102 (see FIG. 1) validates the semantics of the updated set of one or more business rules by executing the business rules of the updated set with an augmented set of documents in step 412. The details of the semantic check and the augmented set of documents in step 412 are discussed below relative to FIG. 5. If inquiry step 414 determines that the one or more business rules of the updated set are not valid based on the semantic check of step 412 (i.e., one or more semantic errors are found in step 412), then IDG 102 (see FIG. 1) automatically notifies the business user of the semantic error(s) in step 416, and step 410 indicates that the updating and validating process continues with step 304 of FIG. 3. Compared to the user who updates the one or more business rules in step 304 (see FIG. 3), the business user who is notified in step 416 may be the same user or a different user.

If inquiry step 414 determines that the updated set of business rules is valid based on the semantic check of step 412, then IDG 102 (see FIG. 1) deploys the one or more updated and validated business rules by moving them from staging area 110 (see FIG. 1) to production area 116 (see FIG. 1) in step 418. The deployment in step 418 replaces business rules 117 (see FIG. 1) with the updated set of business rules 111 (see FIG. 1). Step 420 indicates that the updating and validating process continues with step 312 of FIG. 3.

Semantic Validation of Business Rules

Figure 5:
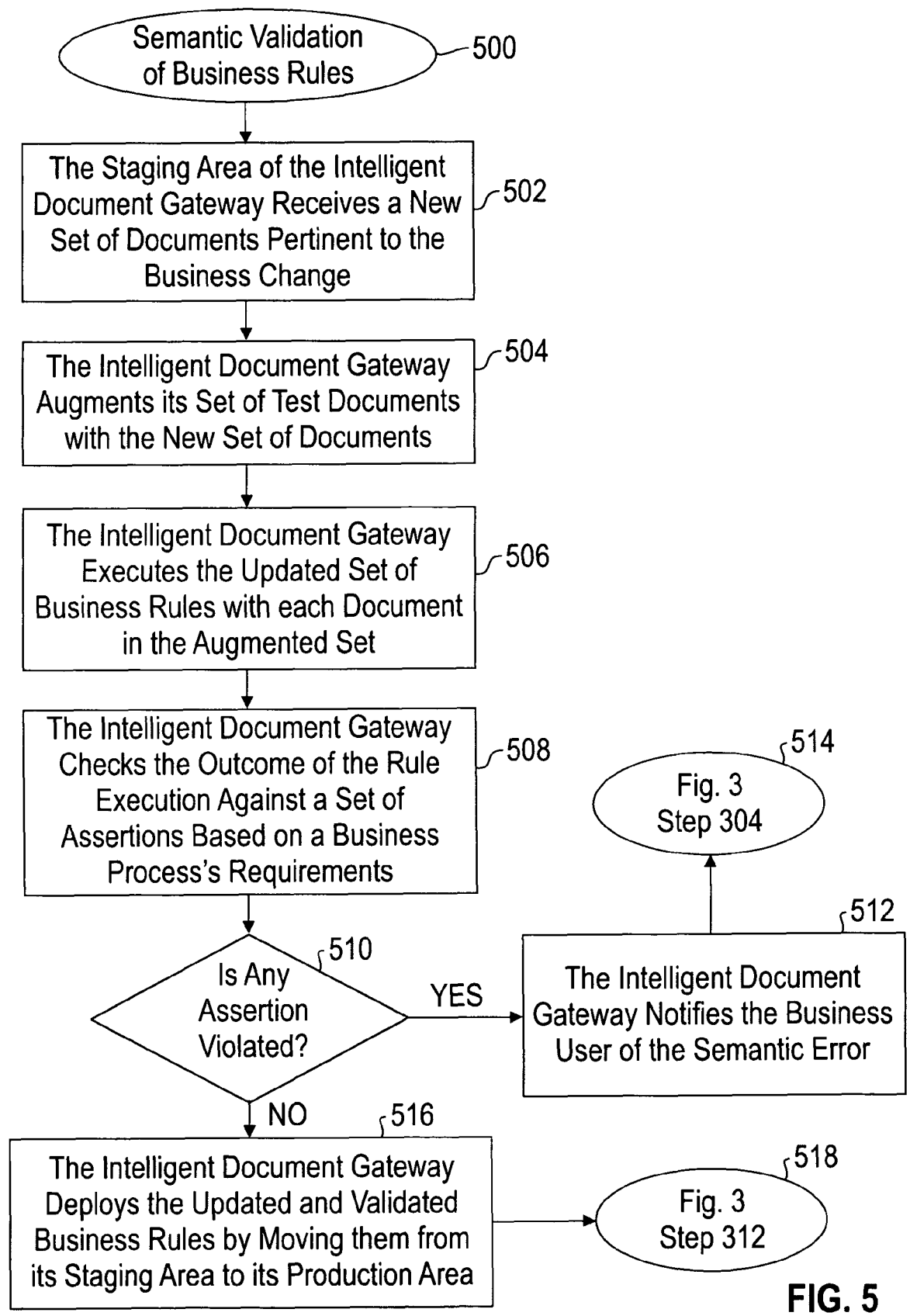
FIG. 5 is a flow chart of an algorithm that implements a semantic validation step of the process of FIG. 4, in accordance with embodiments of the present invention.

FIG. 5 is a flow chart of an algorithm that implements semantic validation step 412 of the process of FIG. 4, in accordance with embodiments of the present invention. The semantic validation process of FIG. 5 begins at step 500. In step 502, staging area 110 (see FIG. 1) of IDG 102 (see FIG. 1) receives a new set of one or more documents pertinent to the business change initiated in step 302 of FIG. 3. The new set of documents includes inbound document 104 (see FIG. 1). A document classifier identifies the type of document, where the type is associated with a particular template file 202 (see FIG. 2) that specifies locations of input values in documents of the identified type. In step 504, IDG 102 (see FIG. 1) combines a set of one or more historical documents 114 (see FIG. 1) (e.g., historical test documents) with the new set of documents received in step 502 to create an augmented set of documents. The set of historical documents was previously utilized to validate the set of business rules prior to the update of step 304 (see FIG. 3).

In step 506, IDG 102 (see FIG. 1) executes the updated set of business rules with each document in the augmented set of documents. As used herein, executing a set of business rules with a document during the semantic validation process is defined as applying the Boolean expression of each business rule in the set to the document, and generating an outcome for each business rule based on the rule's specified action to be taken if the Boolean expression evaluates as "true." Applying the Boolean expression of a business rule to a document includes binding the business rule's one or more input parameters to one or more actual values of the document in a one-to-one correspondence. The binding of the one or more parameters to the one or more actual values is performed via one or more path expressions residing in template file 202 (see FIG. 2).

In a first alternate embodiment, step 506 executes a subset of the updated set of one or more business rules with each document in the augmented set of documents. In a second alternate embodiment, step 506 executes the updated set of business rules with each document of a subset of the augmented set of documents. In a third alternate embodiment, step 506 executes a subset of the updated set of one or more business rules with each document of a subset of the augmented set of documents.

In step 508, IDG 102 (see FIG. 1) checks the outcomes of the execution of the business rules against a set of one or more pre-defined assertions. The pre-defined assertions are based on a business process's requirements. As used herein, a business process is defined as a flow of information and actions within one organization or between organizations, where the flow is determined by a set of business rules. One example of a pre-defined assertion relative to Rule 1 presented above is a statement that at least one recipient must be in the To, Cc, or Bcc field. Inquiry step 510 determines if any of the pre-defined assertions are violated based on the outcome check of step 508. As used herein, a pre-defined assertion is violated if an outcome of the step 506 execution of a set of business rules contravenes a business requirement stated by the assertion. If a pre-defined assertion is violated, then IDG 102 (see FIG. 1) automatically notifies a business user of the semantic error in step 512, and step 514 indicates that the updating and validating process continues with step 304 of FIG. 3. For each violation determined by step 510, the notification in step 512 includes (1) an indication of the one or more pre-defined assertions that were violated, (2) the one or more business rules that were executed in step 506 to cause the violation, and (3) metadata from a document utilized in step 506 with the one or more business rules that caused the violation.

If step 510 determines that no pre-defined assertion is violated, then IDG 102 (see FIG. 1) deploys the set of one or more updated and validated business rules by moving the business rules from staging area 110 (see FIG. 1) to production area 116 (see FIG. 1) in step 516. The deployment in step 516 is equivalent to step 418 of FIG. 4. Step 518 indicates that the updating and validation process continues with step 312 of FIG. 3. After the deployment of step 516, a subsequent performance of the update and validation process of FIG. 3 utilizes the aforementioned augmented set of documents as historical documents 114 (see FIG. 1), which are to be augmented in step 504 with a new set of inbound documents received in step 502.

As an example of the semantic validation process of FIG. 5, a purchase order handling process includes a pre-defined uniqueness assertion that states that exactly one business rule must be executed per inbound document (e.g., purchase order document). If an inbound document causes two rules to be executed, IDG 102 (see FIG. 1) determines that the set of business rules fails the semantic test and is therefore invalid. In this case, IDG 102 (see FIG. 1) identifies the two business rules that caused semantic test failure. The IDG notifies a business user (e.g., by email) of the uniqueness assertion that was violated, the two business rules that caused the violation, and metadata from the inbound document, where the metadata assists the business user in modifying the two identified business rules so that the semantic problem is resolved. For instance, such metadata can include customer and location information included in a purchase order document.

As an example that illustrates how semantic validation facilitates the identification and correction of erroneous business rule updates, consider Rule 1 presented above. If a business user inadvertently changes the logical operator "AND" into "OR" in Rule 1, the business rule will still be syntactically (i.e., grammatically) correct. With the inadvertent change, Rule 1 becomes Rule 1', which is presented below.

Rule 1': If the customer name contains the string "A88" or the country code is in the set {UK, SE}, then notify the following customer service representatives by email:
To: user1@uk.ibm.com
Cc: mgr1@fr.ibm.com, mgr2@uk.ibm.com
Bcc: customer_support@ibmc1.pc.e2open.net In this example, the entire set of business rules that includes Rule 1' does not comply with its business process's requirements. For instance, a test document with customer identifier AN01000099582 and country code SE causes both Rule 1' and Rule 2 to be executed, thereby violating the uniqueness assertion. In this case, being notified of which business rules were executed and the customer information of the test document facilitates the business user's discovery and resolution of this otherwise obscure error.

While the business user corrects the problem in the updated rules, IDG 102 (see FIG. 1) continues to use the previous version of the business rules (i.e., the set of business rules prior to the erroneous update) until the problem is resolved. Therefore, this validation technique facilitates maintaining the service of the gateway even though human errors are made in changing the business rules.

After the business user corrects the problems in the updated business rules, IDG 102 (see FIG. 1) uses the process of FIG. 3 to again check the business rules for syntactic and semantic errors. After IDG 102 (see FIG. 1) determines that the updated set of rules is valid, it deploys the rules from staging area 110 (see FIG. 1) into production area 116 (see FIG. 1). After the deployment, IDG 102 (see FIG. 1) processes inbound documents according to the updated set of business rules.

Business Rule Editing

Figure 6:
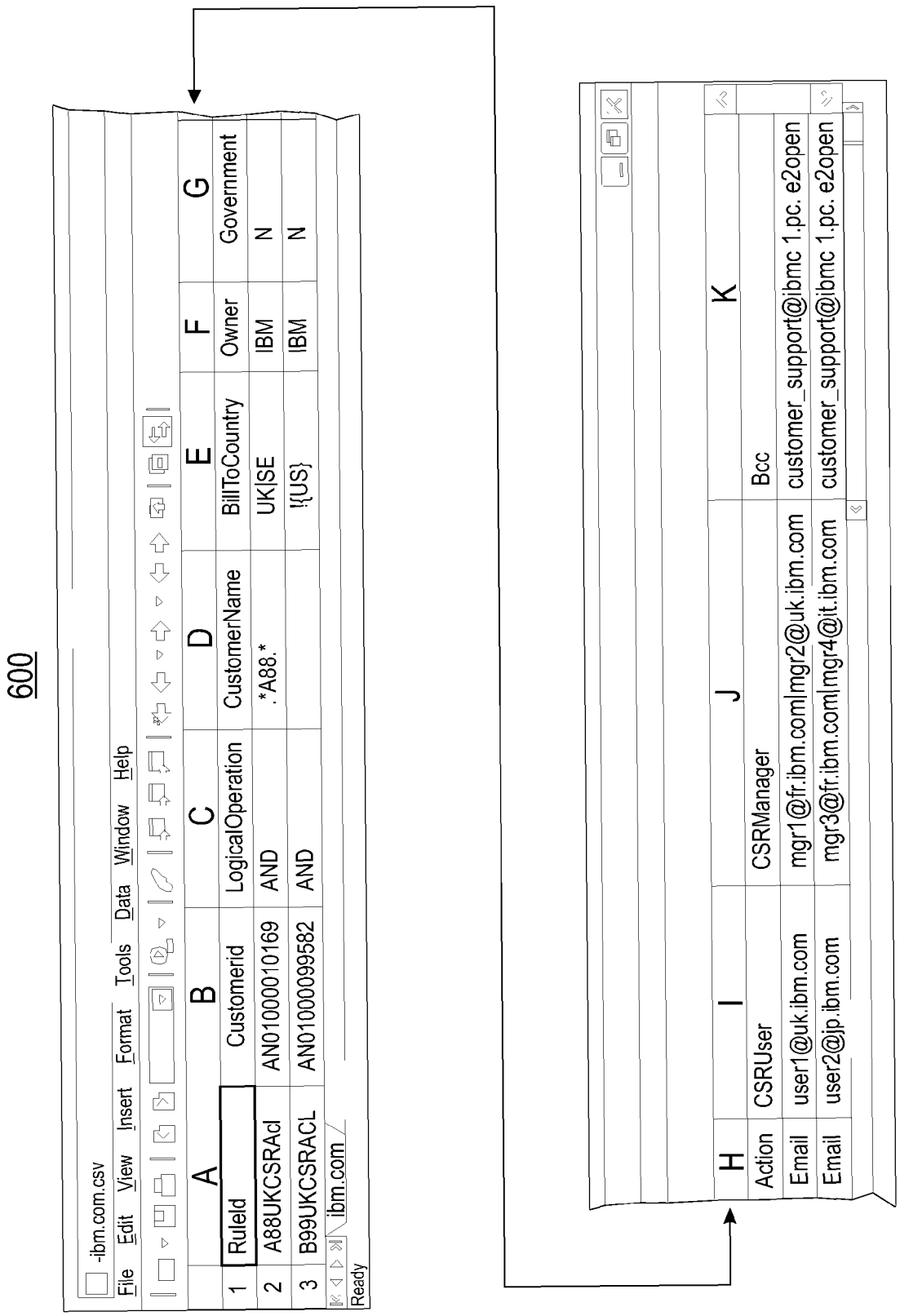
FIG. 6 is a screen capture of a spreadsheet tool by which a business user authors and edits a business rule in the process of FIG. 3, in accordance with embodiments of the present invention.

FIG. 6 is a screen capture of a spreadsheet tool by which a business user authors and edits a business rule in the process of FIG. 3, in accordance with embodiments of the present invention. Screen 600 is an example of a spreadsheet tool utilized by a business user to update a business rule in step 304 of FIG. 3. By using a familiar spreadsheet tool, a business user customizes business logic in business rules without requiring the business user or anyone else to write a computer program, macro or script to perform the business rule updates. In screen 600, the row labeled 2 indicates the Boolean expression and the action of Rule 1 presented above. Further, the row labeled 3 in screen 600 similarly represents Rule 2 presented above. As an example of editing a business rule, a business user changes .*A88.* in the CustomerName column of row 2 to .*A77.* to modify the condition of Rule 1 from "If the customer name contains the string A88 . . . " to "If the customer name contains the string A77 . . . ."

Rule Engine

Knowledge base 106 (see FIG. 1) is processed by, for example, the scripting engine of the Agent Building and Learning Environment (ABLE). ABLE is a lightweight Java® agent framework available from International Business Machines Corporation. The rule-set interface of ABLE is externalized for knowledge engineers. Each rule set can contain any number of rule blocks. Knowledge engineers associate each rule block with an inference engine of their choice provided by ABLE, such as forward chaining, backward chaining, Rete-style pattern matching, Prolog, fuzzy logic, and autonomic planning.

The technique and architecture described herein allows knowledge engineers to experiment with and swap various inference engines at runtime while maintaining the availability of IDG 102 (see FIG. 1). ABLE allows any rule set to be encoded in either an XML format or a more concise ARL format. The architecture described herein provides advanced users (e.g., knowledge engineers) with the capability of performing logical and performance tuning at the ARL level while letting business users edit rules at the higher CSV level concurrently without overwriting the tuning efforts of the advanced users.

XML Template Authoring

Again, each business rule in knowledge base 106 (see FIG. 1) contains a number of input parameters. In one embodiment, each input parameter is bound at runtime to a value from an inbound XML document (e.g., inbound document 104 of FIG. 1). An XML template such as template 202 (see FIG. 2) provides a link between each input parameter name and the location path to an attribute or an element in the inbound XML document.

FIG. 7 is a screen capture of a tool for authoring and editing template 202 of FIG. 2, in accordance with embodiments of the present invention. For example, screen 700 is provided by Document Gateway Architect, an Eclipse plug-in that is available from International Business Machines Corporation. Eclipse is an open source Java® Integrated Development Environment. Authoring or editing an XML template does not require detailed knowledge of XML or XPath. With the Document Gateway Architect tool, a designer imports an inbound document into a business process, and the tool displays a familiar expandable tree view for the designer to browse an XML document (see, e.g., the left portion of screen 700). When the designer selects the attribute or element that contains the input value of a business rule, the Document Gateway Architect tool automatically generates the XML path expression corresponding to the selection. In screen 700, Name is the selected element, and the path corresponding to Name is shown under "Xpath".

Business processes are organized, for example, in Eclipse projects along with the business processes' business rules. In one embodiment, a business user edits business rules by selecting a business rule file to launch a spreadsheet tool within Eclipse. The Document Gateway Architect provides an integrated environment for knowledge authoring. In one embodiment, the gateway uses the standard XSLT engine to process XML template 202 (see FIG. 2) to provide business rules with the runtime values of input parameters. Although XSLT is designed to be a Turing-complete rule engine, ABLE is utilized to execute business rules for two reasons. First, unlike complex XML tree-based transformations, ABLE facilitates expressing rules naturally in terms of straightforward business-logical statements. Second, and more importantly, the advanced intelligent capabilities of ABLE are required by many business applications.

Computing System

Figure 8:
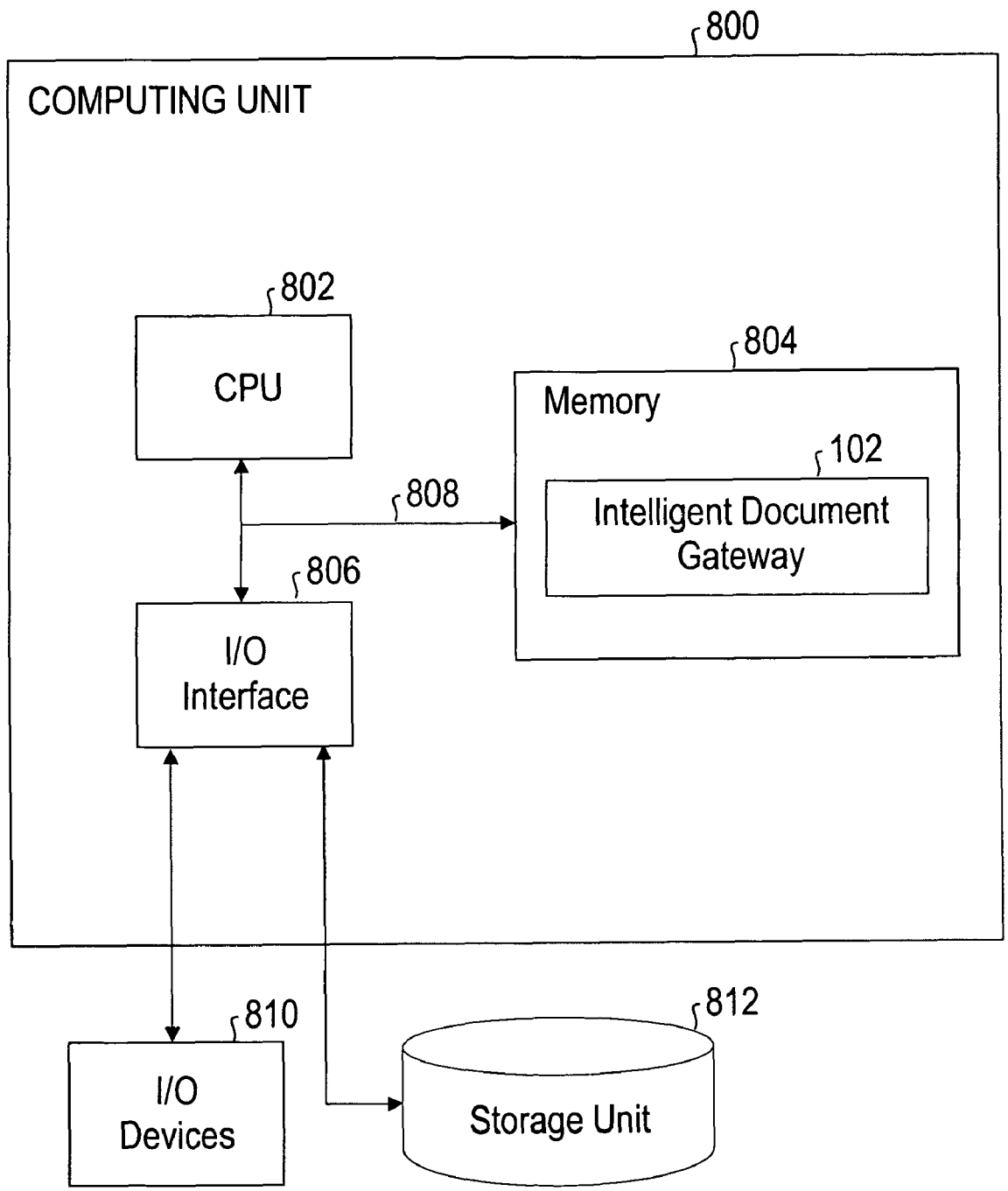
FIG. 8 is a block diagram of a computing system for implementing the process of FIG. 3, in accordance with embodiments of the present invention.

FIG. 8 is a block diagram of a computing unit 800 for implementing the process of FIG. 3, in accordance with embodiments of the present invention. Computing unit 800 is suitable for storing and/or executing program code of gateway 102, and generally comprises a central processing unit (CPU) 802, a memory 804, an input/output (I/O) interface 806, a bus 808, I/O devices 810 and a storage unit 812. CPU 802 performs computation and control functions of computing unit 800. CPU 802 may comprise a single processing unit, or be distributed across one or more processing units in one or more locations (e.g., on a client and server).

Memory 804 may comprise any known type of data storage and/or transmission media, including bulk storage, magnetic media, optical media, random access memory (RAM), read-only memory (ROM), a data cache, a data object, etc. Local memory elements of memory 804 are employed during actual execution of the program code of IDG 102. Cache memory elements of memory 804 provide temporary storage of at least some program code in order to reduce the number of times code must be retrieved from bulk storage during execution. Storage unit 812 is, for example, a magnetic disk drive or an optical disk drive that stores data such as the one or more pre-defined assertions utilized in steps 508 and 510 of FIG. 5. Moreover, similar to CPU 802, memory 804 may reside at a single physical location, comprising one or more types of data storage, or be distributed across a plurality of physical systems in various forms. Further, memory 804 can include data distributed across, for example, a LAN, WAN or storage area network (SAN) (not shown).

I/O interface 806 comprises any system for exchanging information to or from an external source. I/O devices 810 comprise any known type of external device, including a display monitor, keyboard, mouse, printer, speakers, handheld device, printer, facsimile, etc. Bus 808 provides a communication link between each of the components in computing unit 800, and may comprise any type of transmission link, including electrical, optical, wireless, etc.

I/O interface 806 also allows computing unit 800 to store and retrieve information (e.g., program instructions or data) from an auxiliary storage device (e.g., storage unit 812). The auxiliary storage device may be a non-volatile storage device (e.g., a CD-ROM drive which receives a CD-ROM disk). Computing unit 800 can store and retrieve information from other auxiliary storage devices (not shown), which can include a direct access storage device (DASD) (e.g., hard disk or floppy diskette), a magneto-optical disk drive, a tape drive, or a wireless communication device.

Memory 804 includes computer program code comprising IDG 102. The program code of IDG 102 implements the validation technique of FIG. 3. Further, memory 804 may include other systems not shown in FIG. 8, such as an operating system (e.g., Linux) that runs on CPU 802 and provides control of various components within and/or connected to computing unit 800.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code of gateway 102 for use by or in connection with a computing unit 800 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 804, ROM, a rigid magnetic disk and an optical disk. Current examples of optical disks include compact disk-read-only memory (CD-ROM), compact disk-read/write (CD-R/W) and DVD.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of validating business rules, comprising:
    validating, by a computing system, a first set of one or more business rules based on a first set of one or more documents;
    executing, by a production area of said computing system, subsequent to said validating said first set of one or more business rules, and during a runtime of said computing system, a set of business processes based on said first set of one or more business rules;
    receiving, by a staging area of said computing system and subsequent to said validating said first set of one or more business rules, a second set of one or more business rules to be validated, said second set of one or more business rules generated from an update of said first set of one or more business rules, wherein a business rule of said second set of one or more business rules includes a Boolean expression that includes one or more input parameters, and wherein said staging area is different from said production area;
    receiving, by said staging area and subsequent to said validating said first set of one or more business rules, a second set of one or more documents;
    providing, by said computing system, a template file that includes one or more path expressions and said one or more input parameters, wherein said one or more path expressions are associated with said one or more input parameters in a one-to-one correspondence;
    augmenting, by said computing system and subsequent to said receiving said second set of one or more documents, said first set of one or more documents with said second set of one or more documents, wherein a result of said augmenting is an augmented set of documents; and
    automatically validating, by said computing system and subsequent to said augmenting, said second set of one or more business rules, said validating performed against said augmented set of documents or against a subset of said augmented set of documents, wherein said automatically validating comprises:
        semantically validating said second set of one or more business rules, wherein a result of said semantically validating is a set of one or more outcomes based on at least one business rule of said second set of one or more business rules, wherein said semantically validating includes executing said second set of one or more business rules or a subset of said second set of one or more business rules with each document of said augmented set of documents, wherein said executing includes binding, via said one or more path expressions, said one or more input parameters to one or more values included in a document of said augmented set of documents; wherein said executing further includes evaluating, responsive to said binding, said Boolean expression with said one or more values, and wherein said semantically validating further includes determining that no outcome of said set of one or more outcomes violates a predefined assertion of a plurality of predefined assertions based on said set of business processes, deploying said second set of one or more business rules into said production area of said computing system, replacing, in a data storage unit, said first set of one or more business rules with said second set of one or more business rules, and changing, during said runtime of said computing system and without interrupting an availability of said computing system, said executing said set of business processes based on said first set of one or more business rules to executing said set of business processes based on said second set of one or more business rules.

2. The method of claim 1, further comprising generating said second set of one or more business rules by a user utilizing a spreadsheet tool, wherein said generating said second set of one or more business rules does not include writing a computer program, macro or script to generate said update of said first set of one or more business rules.

3. The method of claim 2, wherein said generating said second set of one or more business rules includes updating, by said spreadsheet tool, a comma-separated value file that includes said first set of business rules.

4. The method of claim 1, wherein said automatically validating further comprises syntactically validating said second set of one or more business rules.

5. A computer-implemented method of invalidating an updated business rule, said method comprising:

validating, by a middleware component of a computing system, a set of one or more business rules, wherein said validating said set of one or more business rules is performed against a first set of one or more documents;

executing, by a production area of said middleware component, subsequent to said validating said set of one or more business rules, and during a runtime of said computing system, a set of business processes based on said set of one or more business rules;

receiving, by a staging area of said middleware component and subsequent to said validating said set of one or more business rules, a set of one or more updated business rules, wherein said set of one or more updated business rules is an update of said set of one or more business rules;

determining, by said middleware component and subsequent to said receiving said set of one or more updated business rules, that said set of one or more updated business rules is syntactically valid;

receiving, by said staging area of said middleware component and subsequent to said determining that said set of one or more updated business rules is syntactically valid, a second set of one or more documents;

augmenting, by said middleware component and subsequent to said receiving said second set of one or more documents, said first set of one or more documents with said second set of one or more documents, wherein a result of said augmenting is an augmented set of documents;

applying, by said middleware component and subsequent to said augmenting, said set of one or more updated business rules to each document of said augmented set of documents, wherein a result of said applying is an outcome of an updated business rule of said one or more updated business rules;

determining, by said middleware component and subsequent to said applying, that said outcome violates a predefined assertion of a plurality of predefined assertions associated with said set of business processes; and identifying, by said middleware component, in response to said determining that said outcome violates said predefined assertion, and during said runtime of said computing system, said updated business rule as an invalid business rule, wherein a result of said identifying that said outcome violates said predefined assertion is that an availability of said computing system during said runtime of said computing system is not changed and said executing said set of business processes based on said set of one or more business rules is not changed to executing said set of business processes based on a group of business rules that includes said updated business rule.

6. The method of claim 5, wherein said identifying said updated business rule as said invalid business rule includes sending a notification that said updated business rule includes a semantic error, wherein said notification includes an identification of said predefined assertion, an identification of said updated business rule, and a set of metadata included in said document of said augmented set of documents.

* * * * *